United States Patent [19]

Toda

[11] Patent Number: 5,559,610

[45] Date of Patent: Sep. 24, 1996

[54] IMAGE PROCESSING APPARATUS

[75] Inventor: Kozo Toda, Tokyo, Japan

[73] Assignee: Canon Kabushiki Kaisha, Tokyo, Japan

[21] Appl. No.: 297,832

[22] Filed: Aug. 30, 1994

[30] Foreign Application Priority Data

Sep. 13, 1993 [JP] Japan ................... 5-227307

[51] Int. Cl.⁶ ..................................... H04N 1/40
[52] U.S. Cl. ............................... 358/461; 382/272
[58] Field of Search ........................... 358/461, 464,
358/465, 466, 482, 483; 348/615; 382/274, 270, 271, 273, 272

[56] References Cited

U.S. PATENT DOCUMENTS

4,064,484  12/1977  Mese ...................... 382/272
4,947,445   8/1990  Sakamoto ................. 382/270

*Primary Examiner*—Edward L. Coles, Sr.
*Assistant Examiner*—Shahreen Ali
*Attorney, Agent, or Firm*—Fitzpatrick, Cella, Harper & Scinto

[57] ABSTRACT

An image processing apparatus is configured such that an image is photoelectrically read, a reference signal, which follows an output signal from a reading circuit, is formed, whether the level of the output signal is greater or smaller than the level of the reference signal is detected, and a capacitor, for performing a charging operation or a discharging operation in accordance with a result of the detection, is charged during a predetermined time period before the start of the output of the output signal from the reading circuit.

5 Claims, 12 Drawing Sheets

IMAGE PROCESSING APPARATUS

BACKGROUND OF THE INVENTION

1. Field of the Invention

This invention relates to an image processing apparatus, which is used in a facsimile apparatus or the like, and in which an image of an original is read by an image sensor and is electrically processed.

2. Description of the Related Art

Figure 8:
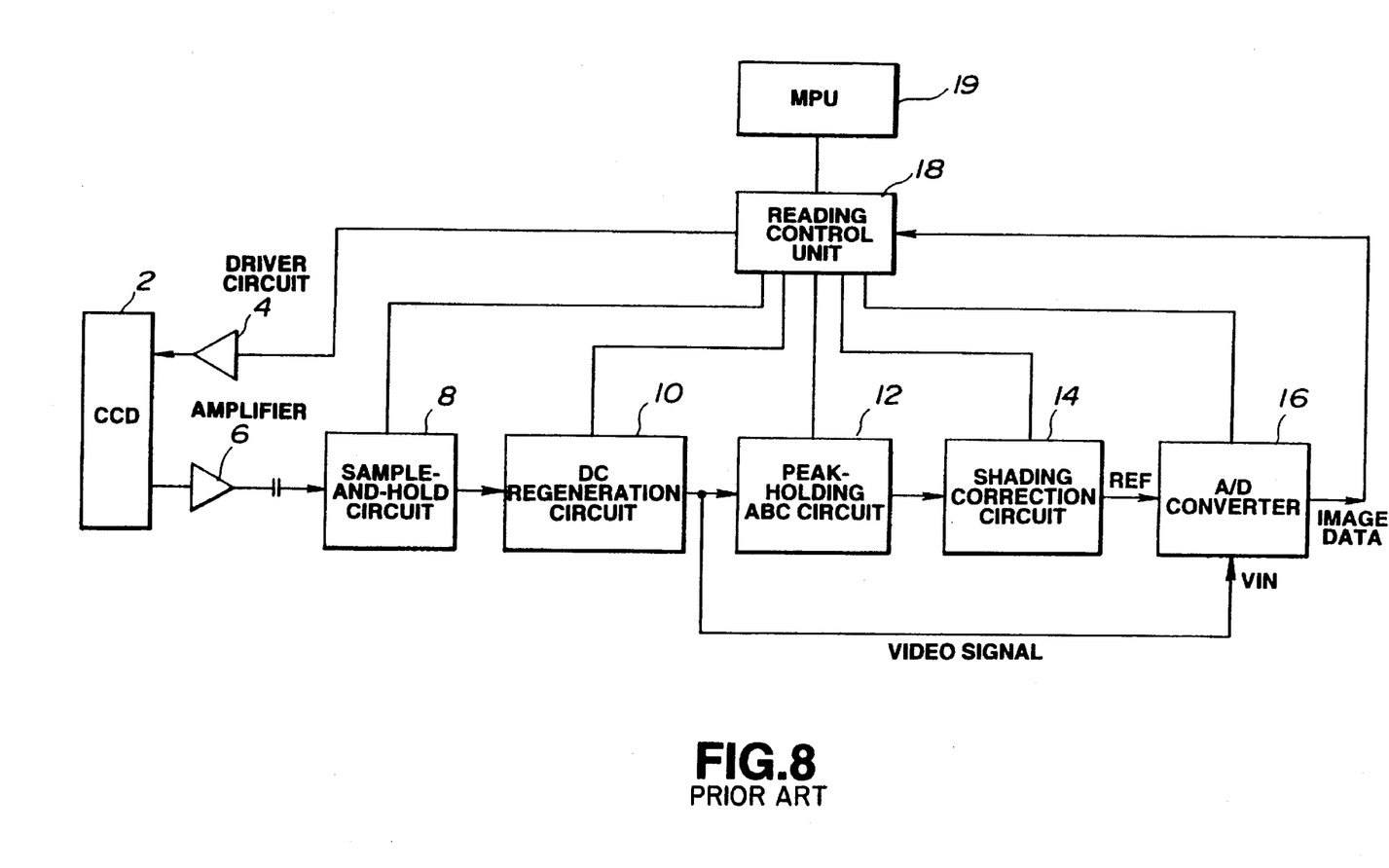
FIG. 8 is a block diagram of the entire image processing apparatus according to a conventional approach.

FIG. 8 is a block diagram of a conventional image processing apparatus. In this apparatus, a linear CCD (charge-coupled device) sensor is used as an image sensor.

In FIG. 8, a CCD sensor 2 converts the amount of light of a read image of an original into an electrical amount. A driver circuit 4 supplies a clock signal for driving the CCD sensor 2. An amplifier 6 amplifies the output of the CCD sensor 2 to an appropriate level. A sample-and-hold circuit 8 extracts only an output portion corresponding to the image of the original from a signal output from the CCD sensor 2 for each bit (pixel). A DC regeneration circuit 10 adjusts the level of an output representing a black portion of the image of the original in the signal subjected to sample-and-hold processing by the sample-and-hold circuit 8 so as to coincide with a bias voltage of a processing circuit. A peak-holding ABC (automatic background control) circuit 12 detects a peak value in the output of the DC regeneration circuit 10 during a reading operation for one line, in order to perform binary-coding processing of the image in consideration of the density of the background of the image of the original. The output signal of the CCD sensor 2 is non-uniform due to variations in its photosensitivity, and unbalance in a reading mechanism (such ununiformity is called "shading distortion"). A shading correction circuit 14 electrically corrects such shading distortion. An A/D converter 16 performs binary-coding processing of a video signal obtained after DC regeneration by the DC regeneration circuit 10 and outputs image data, using a reference signal provided by the peak-holding ABC circuit 12 and the shading correction circuit 14.

A reading control unit 18 controls timing of clock signals and control signals for the respective units. The reading control unit 18 also receives the image data subjected to binary-coding processing by the A/D converter 16, and performs image processing of the image data. The reading control unit 18 is controlled by an MPU (microprocessing unit) 19 for the entire system.

Figure 9:
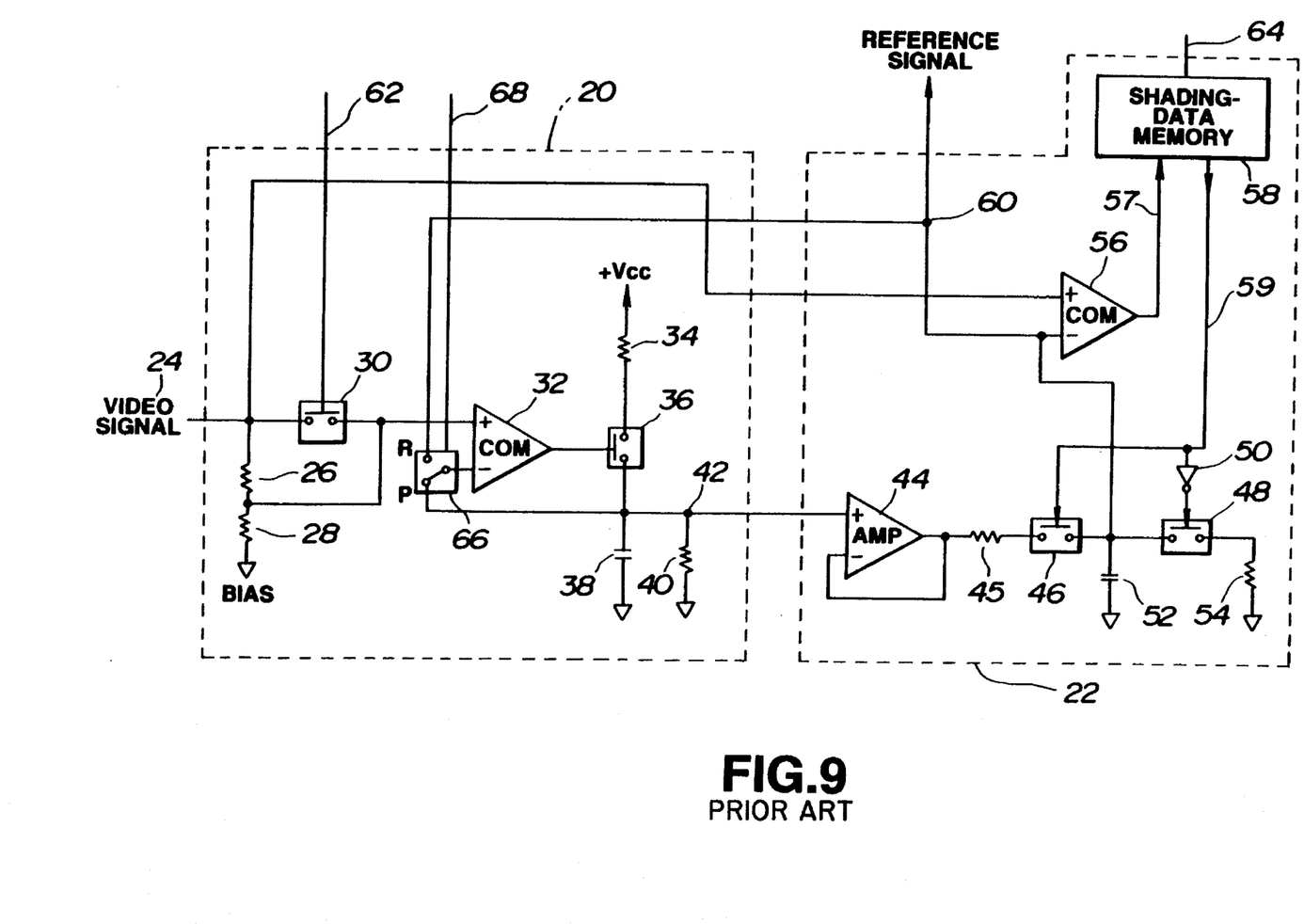
FIG. 9 is a detailed circuit diagram of a peak-holding ABC circuit and a shading correction circuit of the conventional approach.

FIG. 9 illustrates the details of the peak-holding ABC circuit 12 and the shading correction circuit 14 shown in FIG. 8.

In FIG. 9, reference numeral 20 represents a portion corresponding to the peak-holding ABC circuit 12 shown in FIG. 8, and reference numeral 22 represents a portion corresponding to the shading correction circuit 14 shown in FIG. 8.

A video signal 24 is output from the DC regeneration circuit 10 shown in FIGS. 8, Voltage-dividing resistors 26 and 28 divide the voltage of the input video signal 24. An analog switch 30 is closed within the range of ABC. A comparator 32 compares the input video signal with the present peak value. A charging resistor 34 is used for charging a peak-holding capacitor 38. An analog switch 36 is closed while the peak-holding capacitor 38 is charged. The peak-holding capacitor 38 holds the peak value of the video signal. A discharging resistor 40 is used for discharging the peak-holding capacitor 38. Reference numeral 42 represents a peak-value signal appearing in the peak-holding capacitor 38.

A buffer amplifier 44 buffers the peak-value signal 42. A charging resistor 45 is used for charging a shading capacitor 52. An analog switch 46 is closed while the shading capacitor 52 is charged. An analog switch 48 is closed while the shading capacitor 52 is discharged. An inverter 50 inverts a memory-read data signal 59. A discharging resistor 54 is used for discharging the shading capacitor 52.

A comparator 56 compares the video signal 24 with a reference signal 60. Reference numeral 57 represents a memory-writing data signal, which is data output from the comparator 56. A shading-data memory 58 stores shading-correction data. The memory-read data signal 59 is used for opening/closing the analog switches 46 and 48 in accordance with shading-correction data.

Reference numeral 60 represents a reference signal appearing at the shading capacitor 52, and is connected to a REF input terminal of the A/D converter 16 shown in FIG. 8.

Reference numeral 62 represents a control output signal from the reading control unit 18 shown in FIG. 8, which is an ABC-range signal for switching on the analog switch 30 within the range of ABC.

Reference numeral 64 represents a control output signal from the reading control unit 18 shown in FIG. 8, which is a memory control signal for controlling reading/writing operations for the shading-data memory 58.

An analog switch 66 switches an input signal to a (−)-input terminal of the comparator 32 between the peak-value signal 42 and the reference signal 60. Reference numeral 68 represents a control output signal from the reading control unit 18 shown in FIG. 8, which is a switching signal for switching the analog switch 66.

Next, a description will be provided of a reading operation in the apparatus shown in FIGS. 8 and 9. Before reading an image of a first original, in order to store a shading waveform for performing shading correction, a prescanning operation of reading a white background to be read (reference white background) provided within the apparatus by the CCD sensor 2 is performed.

That is, in FIG. 9, the analog switch 30 is closed in response to the ABC-range signal 62, whereby the video signal 24 is input to a (+)-input terminal of the comparator 32. Since the analog switch 66 is set to the side of the peak-value signal 42 in response to the switching signal 68, the held peak-value signal 42 is input to the (−)-input terminal of the comparator 32. If the video signal is greater than the peak-value signal as a result of comparison of the video signal 24 with the peak-value signal 42 by the comparator 32, the analog switch 36 is closed, whereby the peak-holding capacitor 38 is charged via the charging resistor 34 to increase the value of the peak-value signal 42. If the video signal is less than the peak-value signal, the analog switch 36 is kept open, and therefore the value of the peak-value signal 42 does not change. As a result, the value of the peak-value signal 42 coincides with the peak value of the video signal 24.

The peak-value signal 42 is transmitted to the following stage via the buffer amplifier 44. The comparator 56 compares the video signal 24 input to the (+)-input terminal with the reference signal 60 input to the (−)-input terminal. If the video signal is greater than the reference signal as a result of the comparison, the memory-writing data signal 57 becomes 1 (high). If the video signal is less than the reference signal, the memory-writing data signal 57 becomes 0 (low).

In the above-described prescanning operation, the output signal 57 of the comparator 56 is written in the shading-data memory 58, which simultaneously outputs the signal 57 as the memory-read data signal. If the memory-read data signal 57 assumes 1 (high), the analog switch 46 is closed and the analog switch 48 is opened, so that the peak-value signal 42 charges the shading capacitor 52 via the buffer amplifier 44 and the charging resistor 45. If the memory-read data signal assumes 0 (low), the analog switch 46 is opened and the analog switch 48 is closed, so that the shading capacitor 52 is discharged via the discharging resistor 54.

By repeating such charging/discharging of the shading capacitor 52, a waveform obtained by approximating the waveform of the video signal representing the current reading line with the charging-discharging of the shading capacitor 52 appears on the reference signal 60, and at the same time charging-discharging data (shading data) is stored in the shading-data memory 58.

In general, time is required for charging each peak value in the peak-holding capacitor 38. Hence, shading data is obtained by repeating the above-described operation for a few lines.

Figure 10A:
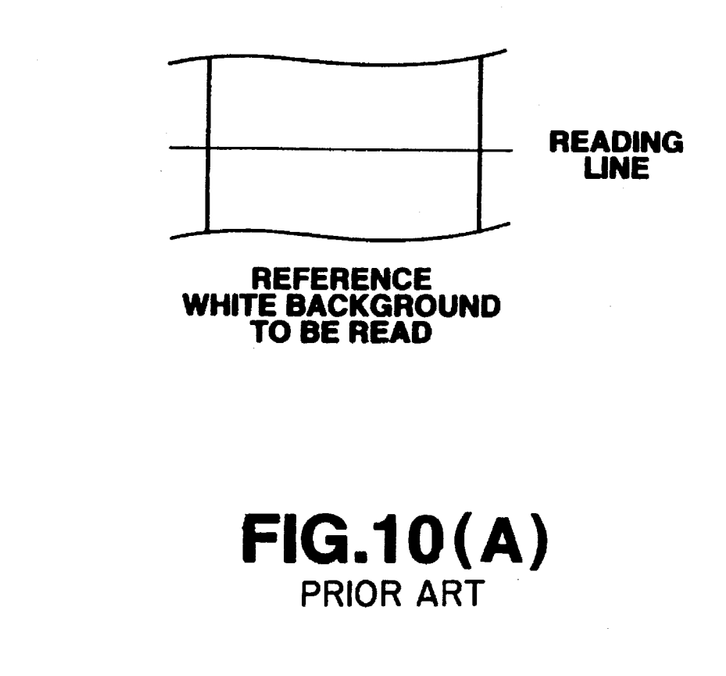
FIGS. 10(A)–10(B), 11(A)–11(C), 12 and 13 are diagrams illustrating the operations of the conventional apparatus.
Figure 10B:
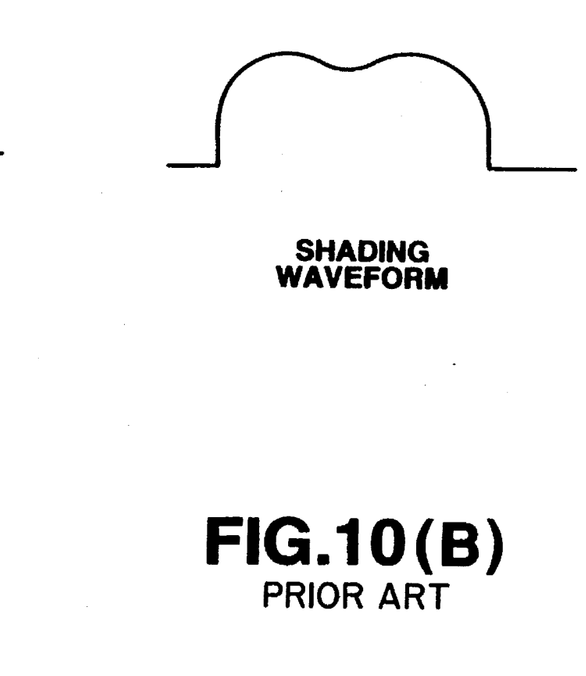

FIG. 10(A) is a diagram schematically illustrating an operation of obtaining a shading waveform shown in FIG. 10(B), which includes variations in the amount of light of a reading light source and in the sensitivity of the CCD sensor 2, by a prescanning operation of reading a reference white background to be read by the CCD sensor 20;

Thereafter, an operation of actually reading the original is performed.

The ABC-range signal 62 closes the analog switch 30 within the range of ABC for the width of the original. In the present embodiment, however, it is assumed that the width of the original is the range of ABC, and the analog switch 30 is closed while the original is read.

The original-reading video signal 24 reaches the (+)-input terminal of the comparator 32. While the original is read, the analog switch 66 is set to the side of the reference signal 60 in response to the switching signal 68, so that the reference signal 60 is input to the (−)-input terminal of the comparator 32. In the same manner as described above, by opening/closing the analog switch 36 in accordance with results of comparison between the video signal 24 and the reference signal 60, the reference signal 60 finally coincides with the video signal 24.

The previously stored shading-correction data is read from the shading-data memory 58 in synchronization with each reading line in response to the memory control signal 64. The analog switches 46 and 48 are opened/closed in accordance with the shading-correction data comprising a value of 1 (high) or 0 (low), and the shading waveform obtained during the prescanning operation is reproduced in the reference signal 60 caused by charging/discharging of the shading capacitor 52.

The obtained reference signal 60 is input to the reference input terminal (REF) of the A/D converter 16 shown in FIG. 8, and the video signal 24 is input to an analog input terminal ($V_{IN}$) of the A/D converter 16, so that binary-coded image data subjected to shading correction is obtained and transmitted to the reading control unit 18.

Figure 11A:
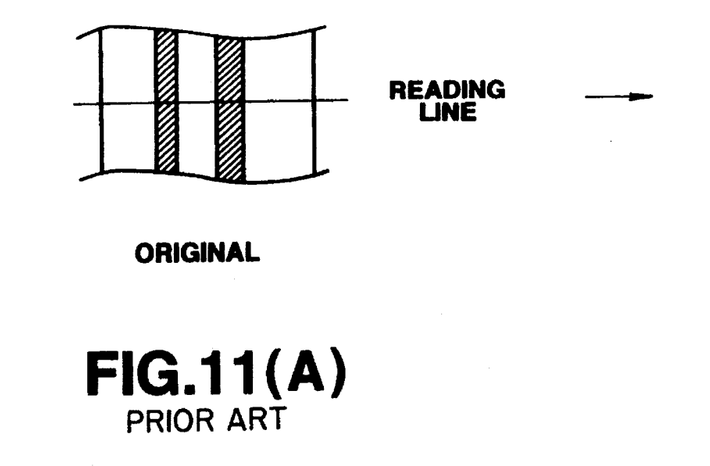
Figure 11B:
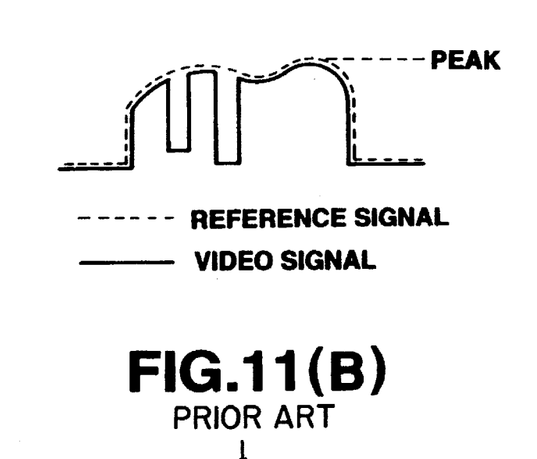
Figure 11C:
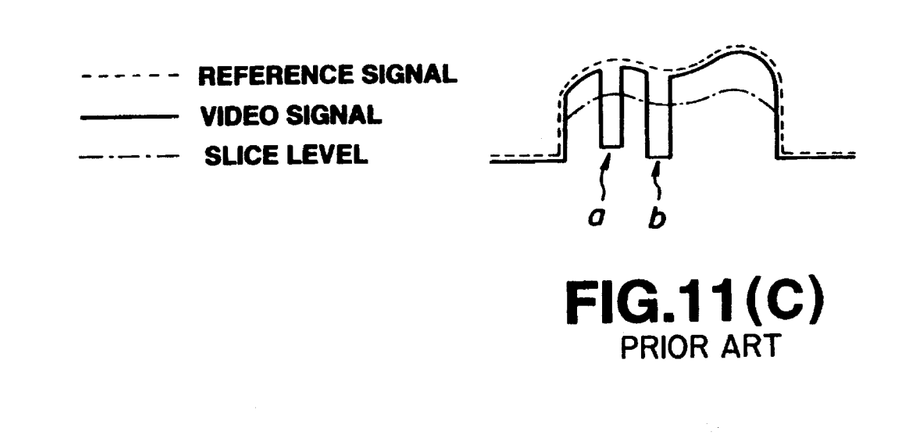

Accordingly, in the case of an original having black portions "a" and "b" shown in FIG. 11(A), the reference signal and the video signal shown in FIG. 11(B) are obtained while the original is read. If 60% of the reference signal level is made a slice level in the reading control unit 18 shown in FIG. 8, the portions "a" and "b" are lower than the slice level, as shown in FIG. 11(C). Hence, the portions "a" and "b" are determined to be black portions.

By repeating the above-described operation for one line in the sub-scanning direction, reading for one page is performed.

In the above-described processing in the conventional apparatus, storage and reproducing operations of the shading waveform will be described in further detail.

Figure 12:
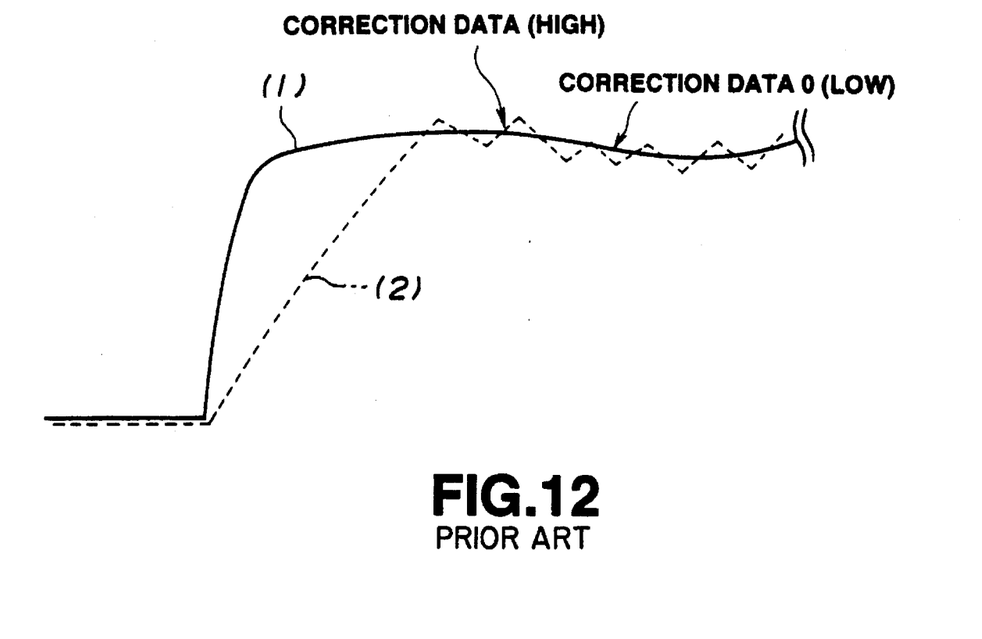

In the present case, it is assumed that shading-correction data comprises one bit for one pixel. In the vicinity of the first bit (the first pixel) in the output of the CCD sensor 2 shown in FIG. 8 during the prescanning operation, correction data comprises consecutive 1's ("high"s) because of the leading edge of a white-background video signal, so that the analog switch 46 shown in FIG. 9 is closed and the shading capacitor 52 is charged. At that time, charging is performed with a time constant T which is obtained by multiplying the resistance value of the charging resistor 45 by the capacitor value of the shading capacitor 52. Hence, as shown in FIG. 12, the actual reference signal (2) rises slower than the white-background video signal (1), and is therefore greatly degraded in the vicinity of the leading edge. After the actual reference signal (2) has followed and coincided with the white-background video signal (1), a reference signal, which substantially approximates the white-background video signal (1), can be obtained by repeating charging/discharging of the capacitor 52 in accordance with 1 (high) or 0 (low) of correction data for each pixel (each bit).

Figure 13:
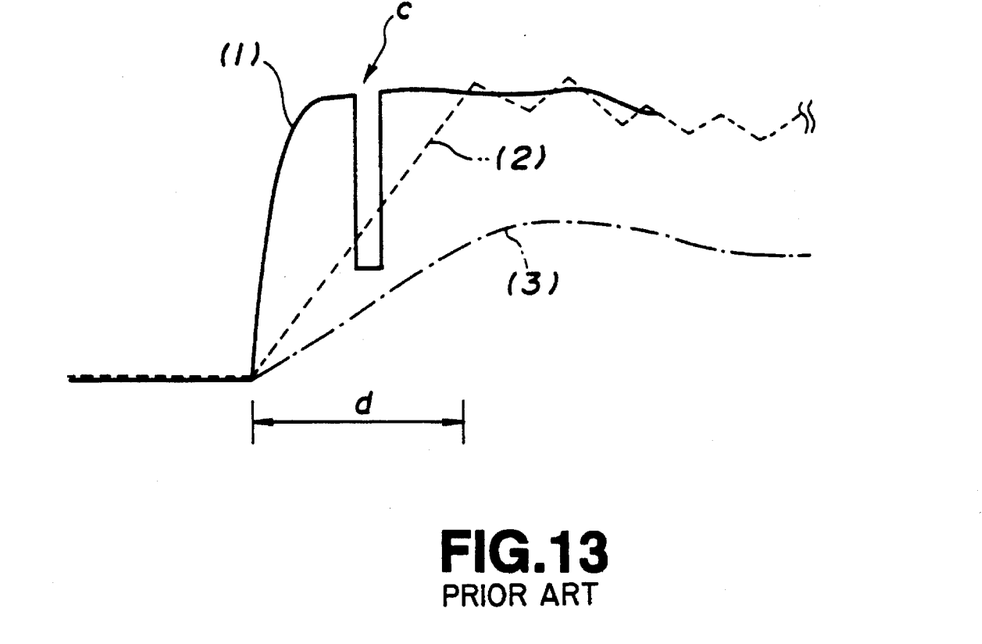

However, as shown in FIG. 13, when reproducing the reference waveform (shading waveform) while the original is read, using shading-correction data obtained by the above-described prescanning operation, a reference signal (2) having a slow leading edge is reproduced as in the above-described case. Accordingly, when an original-reading video signal (1) is input, the original-reading video signal (1) is greater than the actual reference signal (2) at an interval d, thereby causing overflow errors at a binary-coding processing by the A/D converter 16 shown in FIG. 8. Hence, exact binary-coding processing cannot be performed for the reference signal.

As a result, in the case of a halftone mode in which relative gradation is expressed for the reference signal, exact gradation expression cannot be performed at all, and a white portion is produced in the obtained image.

Even in a binary mode, if a black portion represented by "c" in FIG. 13 is present, the 60-% slice level of the reference signal (2) becomes as indicated by a binary-value slice level (3). Hence, the portion "c" is not estimated as a black portion, but as a white portion, thereby causing missing information.

In the present case, the reading sensor shown in FIG. 8 comprises a CCD sensor. When the original-reading width of the CCD sensor 2 is much larger than that of the apparatus, error information can be abandoned by making the portion d shown in FIG. 13 to be outside the effective reading range of the apparatus. However, as in the case of a contact sensor (CS), when the reading width of the apparatus substantially equals that of the sensor, an error as indicated by c in FIG. 13 is produced in the vicinity of the first bit of reading information, thereby causing serious problems, such as degradation of the quality of the obtained image, and missing of information.

SUMMARY OF THE INVENTION

It is an object of the present invention to solve the above-described problems.

It is another object of the present invention to provide an image processing system which can process an image signal so as to have high picture quality.

It is still another object of the present invention to provide an image processing apparatus which can process an image signal so as to have little missing information and little degradation of the picture quality.

It is yet another object of the present invention to provide an image processing apparatus which can process an image signal using a reference signal which is faithful to an original image.

According to one aspect, the present invention, which achieves these objectives, relates to an image processing apparatus comprising means for photoelectrically reading an image, means for forming a reference signal which follows an output signal from the reading means, means for detecting whether the level of the output signal from the reading means is greater or smaller than the level of the reference signal, capacitance means for performing a charging operation or a discharging operation in accordance with a result of the detection output from the detection means, and means for charging the capacitance means during a predetermined time period before the start of the output of the output signal from the reading means.

In the above-described configuration, the capacitance means is precharged before starting reading of the image. Hence, the leading edge of the reference signal when starting reading of the image is improved, so that degradation of the image and missing of information in the vicinity of the leading edge can be prevented.

In another aspect, the present invention relates to an image processing apparatus comprising means for photoelectrically reading an image, means for forming a reference signal which follows an output signal from the reading means, means for detecting whether the level of the output signal from the reading means is greater or smaller than the level of the reference signal, capacitance means for performing a charging operation or a discharging operation in accordance with a result of the detection output from the detection means, and means for switching a time constant of a circuit for charging the capacitance means, during a predetermined time period after the start of the output of the output signal from the reading means.

In the above-described configuration, by providing a short time constant for the circuit for charging the capacitance means when starting reading of the image, and thereafter switching to a long time constant, the reference signal can follow the image signal immediately after starting reading of the image, so that degradation of the image and missing of information can be prevented.

The foregoing and other objects, advantages and features of the present invention will become more apparent from the following description of the preferred embodiments taken in conjuction with the accompanying drawings.

DESCRIPTION OF THE PREFERRED EMBODIMENTS

Figure 1:
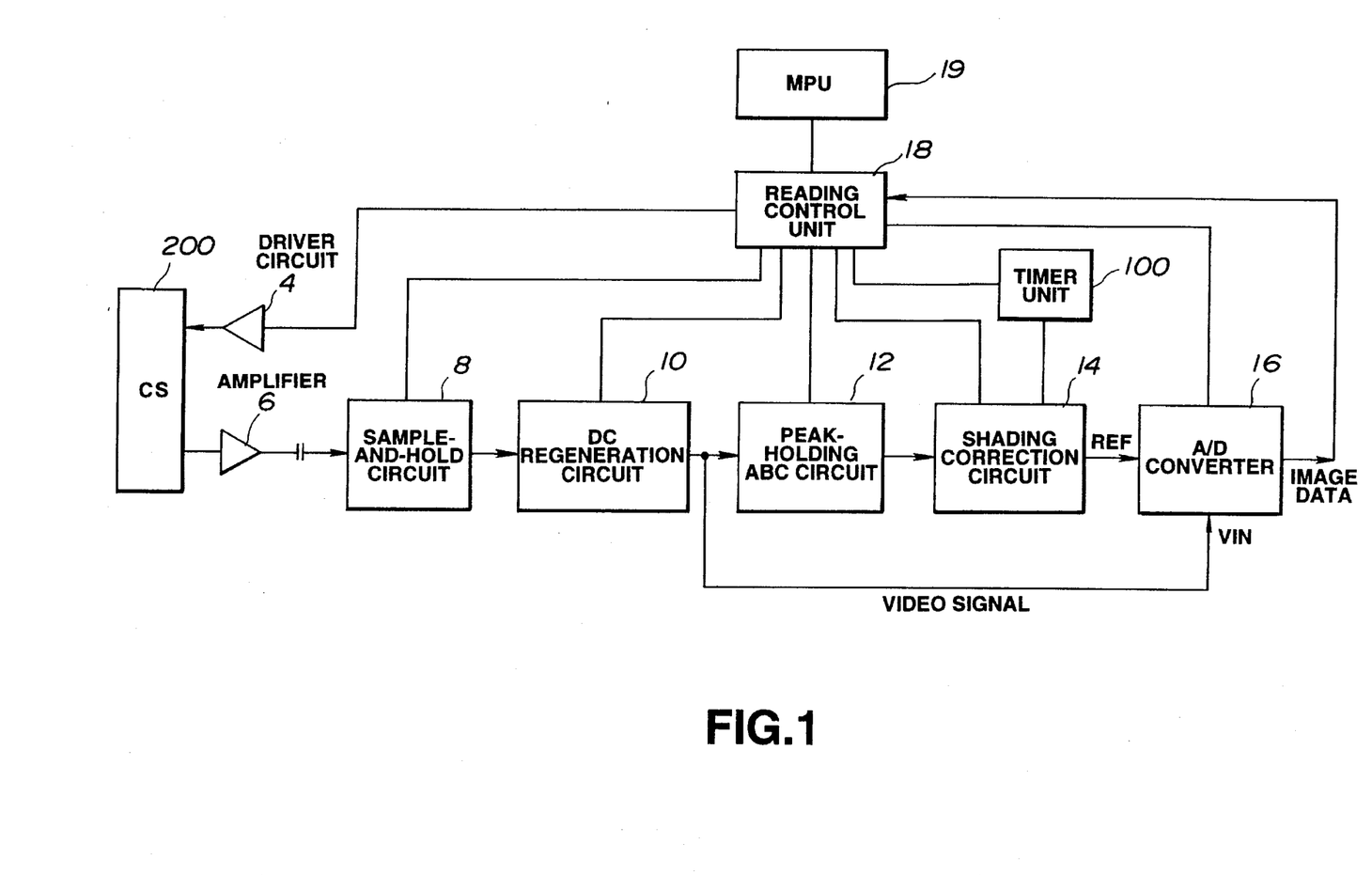
FIG. 1 is a block diagram of the entire image processing apparatus according to a first embodiment of the present invention.

FIG. 1 is a block diagram of an image processing apparatus according to a first embodiment of the present invention.

In FIG. 1, components having the same reference numerals as those in FIG. 8 have the same functions as the corresponding components shown in FIG. 8, and a description thereof will be omitted. In order to improve the performance of the reading sensor, a CS (contact sensor) 200 having unit magnification is used. In FIG. 1, a timer unit 100, which is started in response to a reading start signal for one line controlled by the reading control unit 18, is also added.

Figure 2:
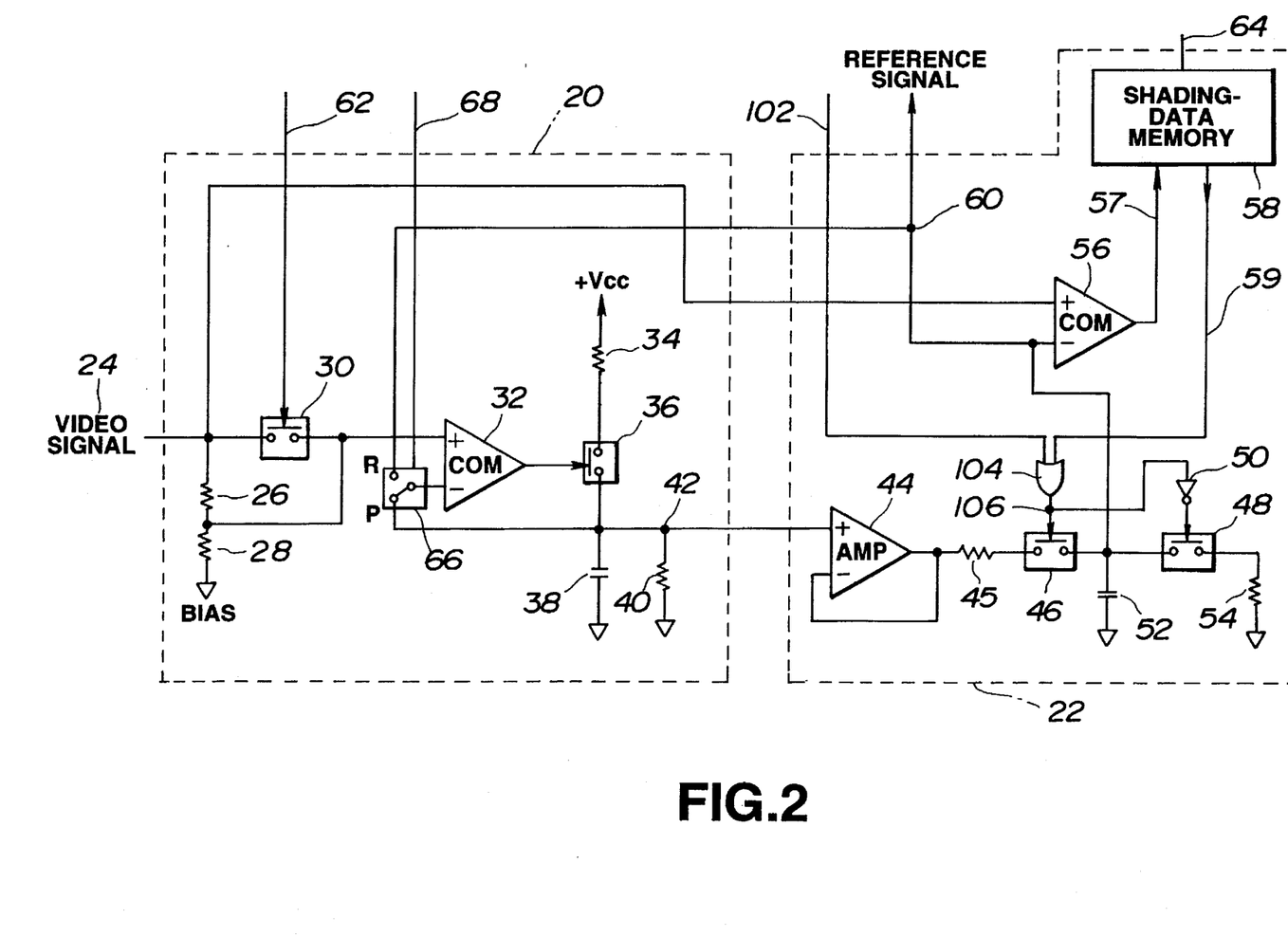
FIG. 2 is a detailed circuit diagram of a peak-holding ABC circuit and a shading correction circuit of the first embodiment.

FIG. 2 illustrates in detail the peak-holding ABC circuit 12 and the shading correction circuit 14 shown in FIG. 1. Also in FIG. 2, components having the same reference numerals as those in FIG. 9, illustrating the conventional approach, have the same functions as the corresponding components shown in FIG. 9.

Reference numeral 102 represents an output signal from the timer unit 100 shown in FIG. 1. The output signal 102 usually assumes 0 (low), and becomes 1 (high) after the time set by the timer unit 100 has been counted. An OR gate 104 obtains the logical sum of the output signal of the shading memory 59 and the output signal of the timer unit 100. Reference numeral 106 represents an output signal from the OR gate 104.

Next, the operation of the apparatus of the first embodiment will be described with reference to FIGS. 3 and 4.

Figure 3:
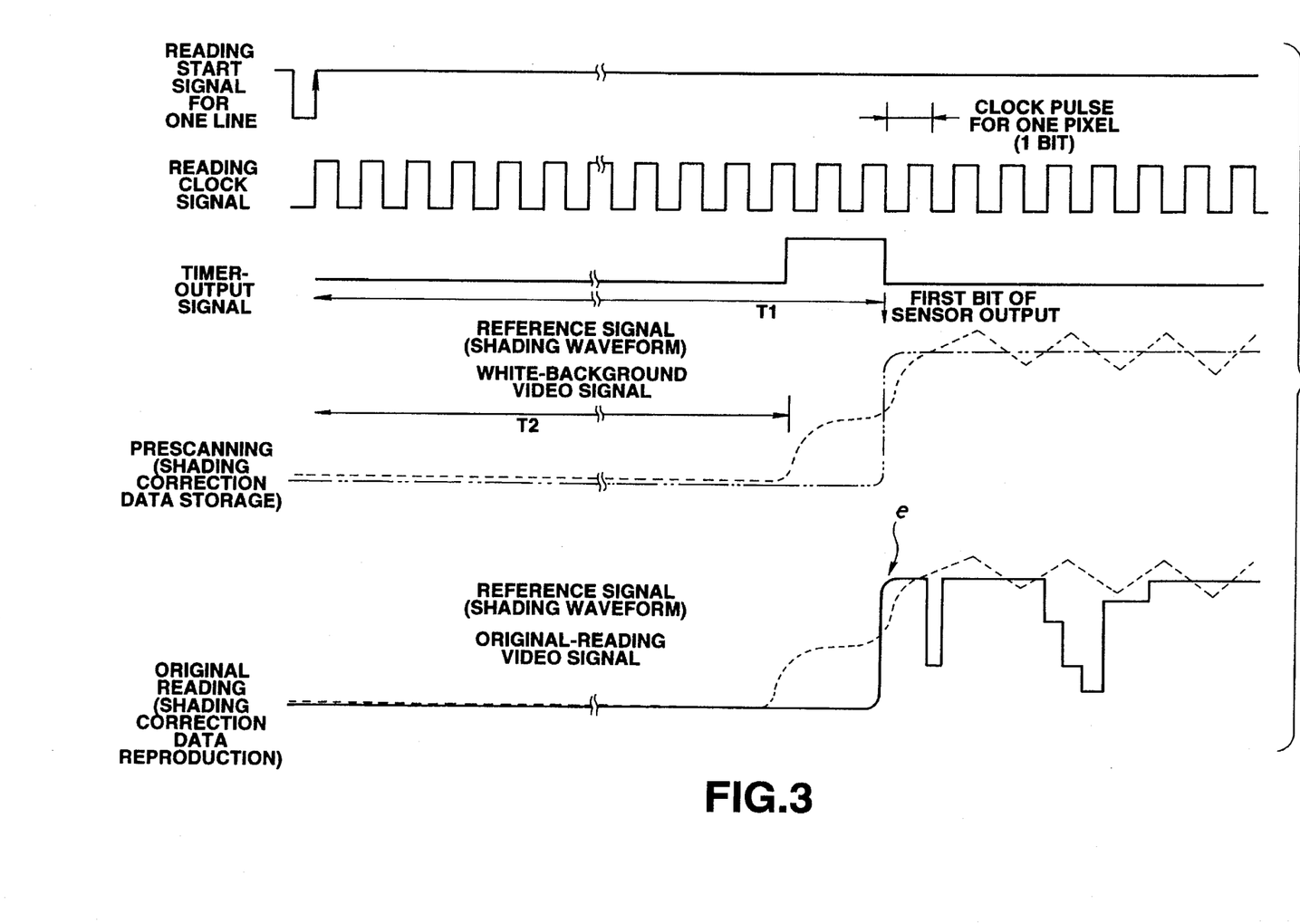
FIG. 3 is a timing chart of the operation of the first embodiment.

In FIG. 3, a reading start signal for one line controls the reading control unit 18, shown in FIG. 1, so as to perform a synchronizing operation of reading of one line and to start reading for one line. The reading start signal for one line comprises a pulse signal to reset the sample-and-hold circuit 8, the DC regeneration circuit 10, the peak-holding ABC circuit 12, the shading correction circuit 14, the A/D converter 16 and the timer unit 100, and to start a reading operation of one line.

A reading clock signal is transmitted to the above-described respective units so as to drive each pixel (bit) of the sensor and to process the output of the sensor.

A timer output signal is the output of the timer unit 100, and is represented by reference numeral 102 shown in FIG. 2. For the timer unit 100 shown in FIG. 1, an arbitrary time T2, having the relationship of T1 being longer than T2, wherein a time T1 represents a time until CS 200 shown in FIG. 1 outputs the first bit after a reading start for one line operation, can be set, so that the timer unit 100 outputs 1 (high) between the time T1 and the time T2 after the reading start for one line operation.

Figure 4:
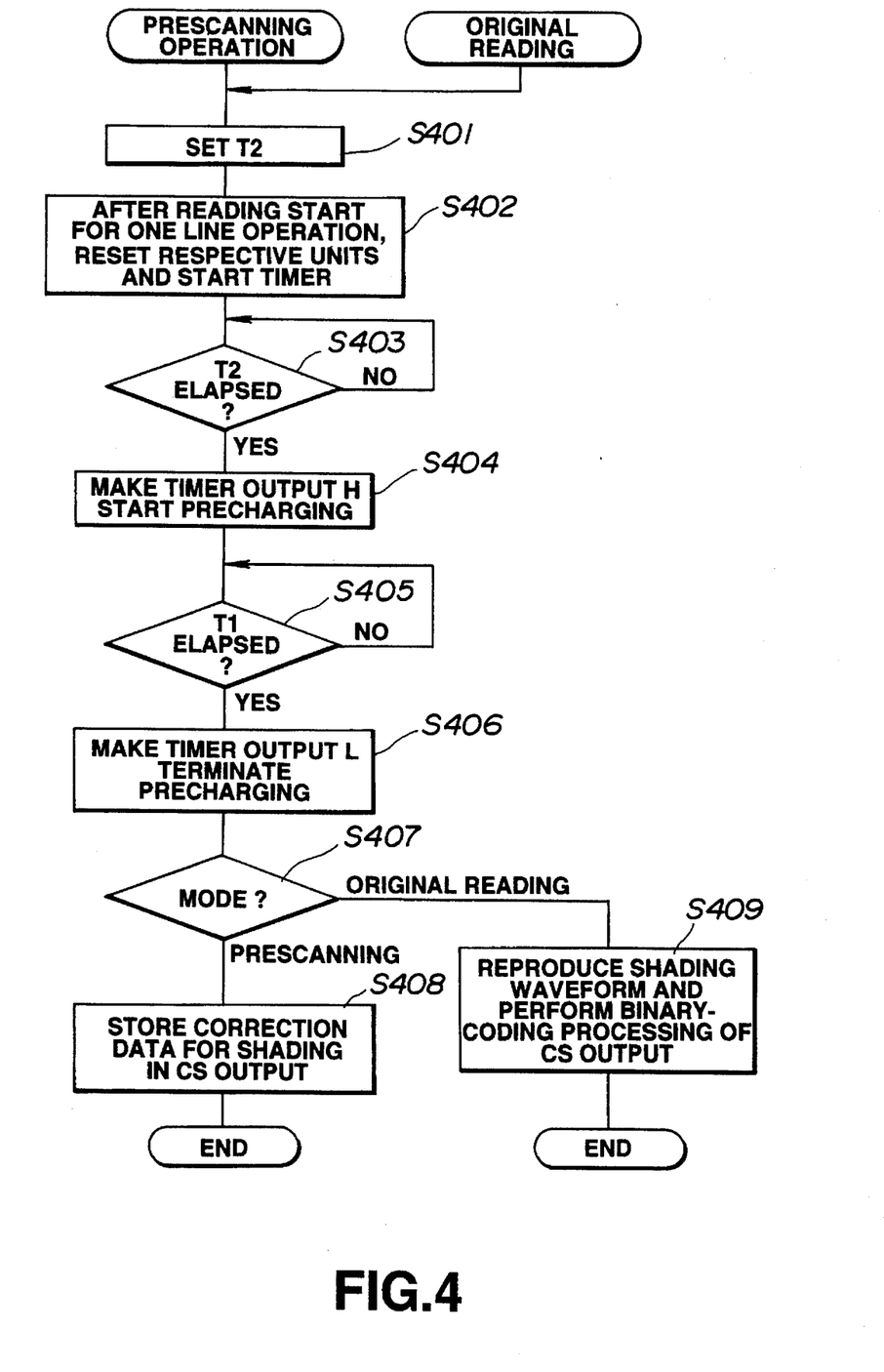
FIG. 4 is a flowchart of the operation of the first embodiment.

A prescanning operation will now be considered with reference to FIG. 4. After setting the timer value T2 (step S401), the timer unit 100 is started when the input of a reading start signal for one line has been confirmed (step S402). After the lapse of the time T2 before reading reference white background to be read (step S403), the timer output signal 102 shown in FIG. 2 is made 1 (high) until the lapse of the time T1 (step S404). Hence, the output signal 106 of the OR gate 104 becomes 1 (high) irrespective of the output signal 59 from the shading memory 59. The analog switch 46 is closed during this time period, and the shading capacitor 52 is charged.

Accordingly, when starting the sensor reading output after the lapse of the time T1, a certain amount of electric charge has already been stored in the shading capacitor 52.

In the present embodiment, the time T2 is set so that the amount of charge stored when starting reading becomes about 50% of the reference white background have been read.

After starting the sensor output (after the lapse of the time T1) (step S405), the timer output signal 102 is made 0 (low) (step S406). Hence, as described in the case of the conventional approaching, a result of comparison between the reference signal 60 and the video signal 24 by the comparator 56 is stored in the shading-data memory 58 as shading correction data (step S408). At the same time, the result of comparison is output as the memory output 59 to provide the output signal 06 of the OR gate 104, which signal performs opening/closing of the analog switches 46 and 48, so that the shading correction data is stored while providing a shading waveform by charging/discharging the shading capacitor 52.

By thus precharging the shading capacitor 52 before reading the white background to be read, charging of the shading capacitor 52 promptly follows the white-background reading signal. Accordingly, excellent shading correction data, which is not influenced by delay in charging of the shading capacitor 52, can be stored.

As in the above-described case of reading the white background to be read, when reading the original after reading the white background, precharging of the shading capacitor 52 is performed until the time T1 after the lapse of the time T2 after a reading start for one line operation. Thereafter, the analog switches 46 and 48 are opened/closed in accordance with the reading output 59 from the shading-data memory 58, so that a shading waveform (reference signal) is reproduced (step S409).

Hence, as shown in FIG. 3, the reference signal follows the original-reading video signal substantially immediately after the start of the sensor output, and the number of error portions, such as portion "e", is considerably reduced.

In the above-described first embodiment, there is provided the timer unit 100, which measures the time T1 and T2 (T1 is longer than T2) until the CS 200 starts a reading operation after a reading start signal for one line has been output and which outputs 1 (high) until the time T1 is measured after measuring the time T2, and outputs 0 (low) for other time periods. The logical sum of the output of the shading-data memory 58 and the output of the timer 100 is obtained, and the analog switch 46 for charging the shading capacitor 52 is controlled by the output of the logical sum, so that precharging for the shading capacitor 52 is performed before starting reading of the CS 200. It is thereby possible to improve the leading edge of the reference signal (shading waveform) in the vicinity of the first bit of the sensor output, and to substantially prevent missing information caused by disturbance or a white portion in the image in the vicinity of the leading edge.

Figure 5:
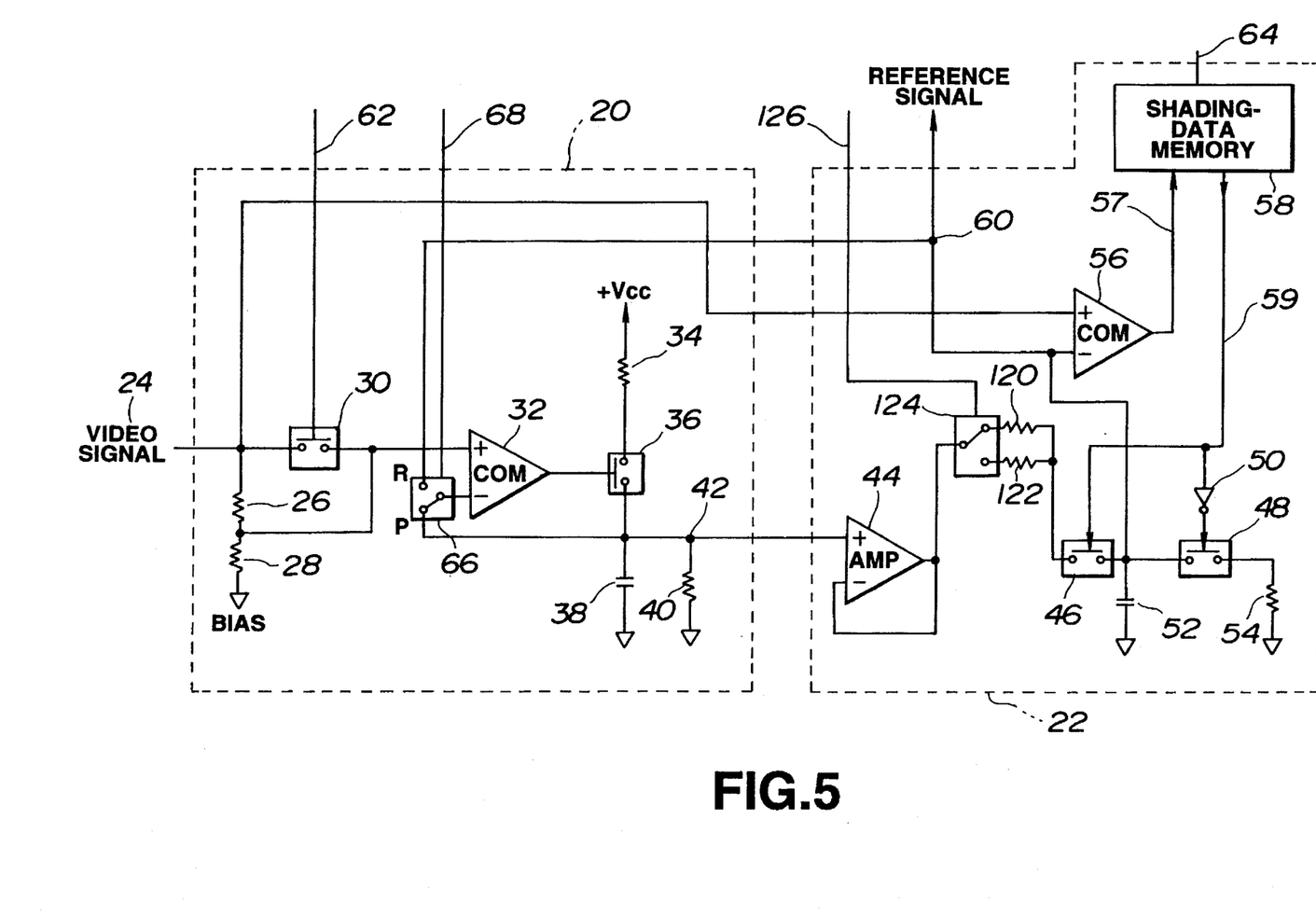
FIG. 5 is a detailed circuit diagram of a peak-holding ABC circuit and a shading correction circuit according to a second embodiment of the present invention.

FIG. 5 is a circuit diagram of a peak-holding circuit 12 and a shading correction circuit 14 according to a second embodiment of the present invention.

Also in FIG. 5, components having the same reference numerals as those in FIG. 9, illustrating the conventional approach, have the same functions as the corresponding components, and a description thereof will be omitted.

In FIG. 5, reference numerals 120 and 122 represent charging resistors for the shading capacitor 52 connected to the output of the peak-value buffer amplifier 44. The values of the charging resistors 120 and 122 are arranged such that the relationship t1 is smaller than t2 holds, where a time constant t1 is obtained by multiplying the resistance value of the resistor 120 by the capacitor value of the capacitor 52, and a time constant t2 is obtained by multiplying the resistance value of the resistor 122 by the capacitor value of the capacitor A switch 124 is an analog switch for switching between the charging resistor 120 and the charging resistor 122.

The switch 124 is set to the side of the resistor 120 (the time constant is t1) when a timer output signal 126 assumes 1 (high), and is set to the side of the resistor 122 (the time constant is t2) when the timer output signal 126 assumes 0 (low).

The signal 126 is the output of the timer unit 100 shown in FIG. 1, and is a switching signal for the analog switch 124.

The operation of the apparatus of the present embodiment will be now described with reference to FIGS. 6 and 7.

Figure 6:
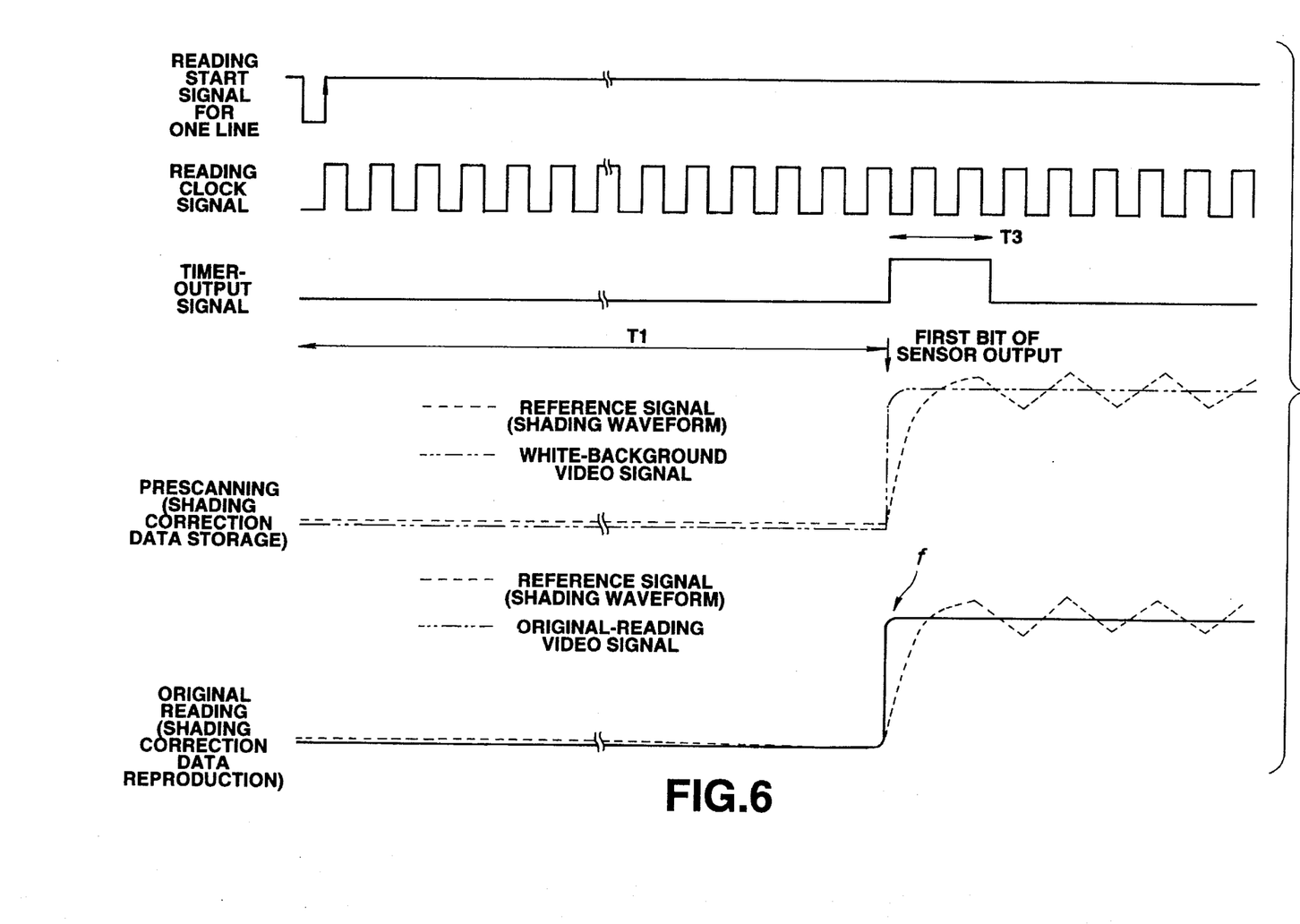
FIG. 6 is a timing chart of the operation of the second embodiment.
Figure 7:
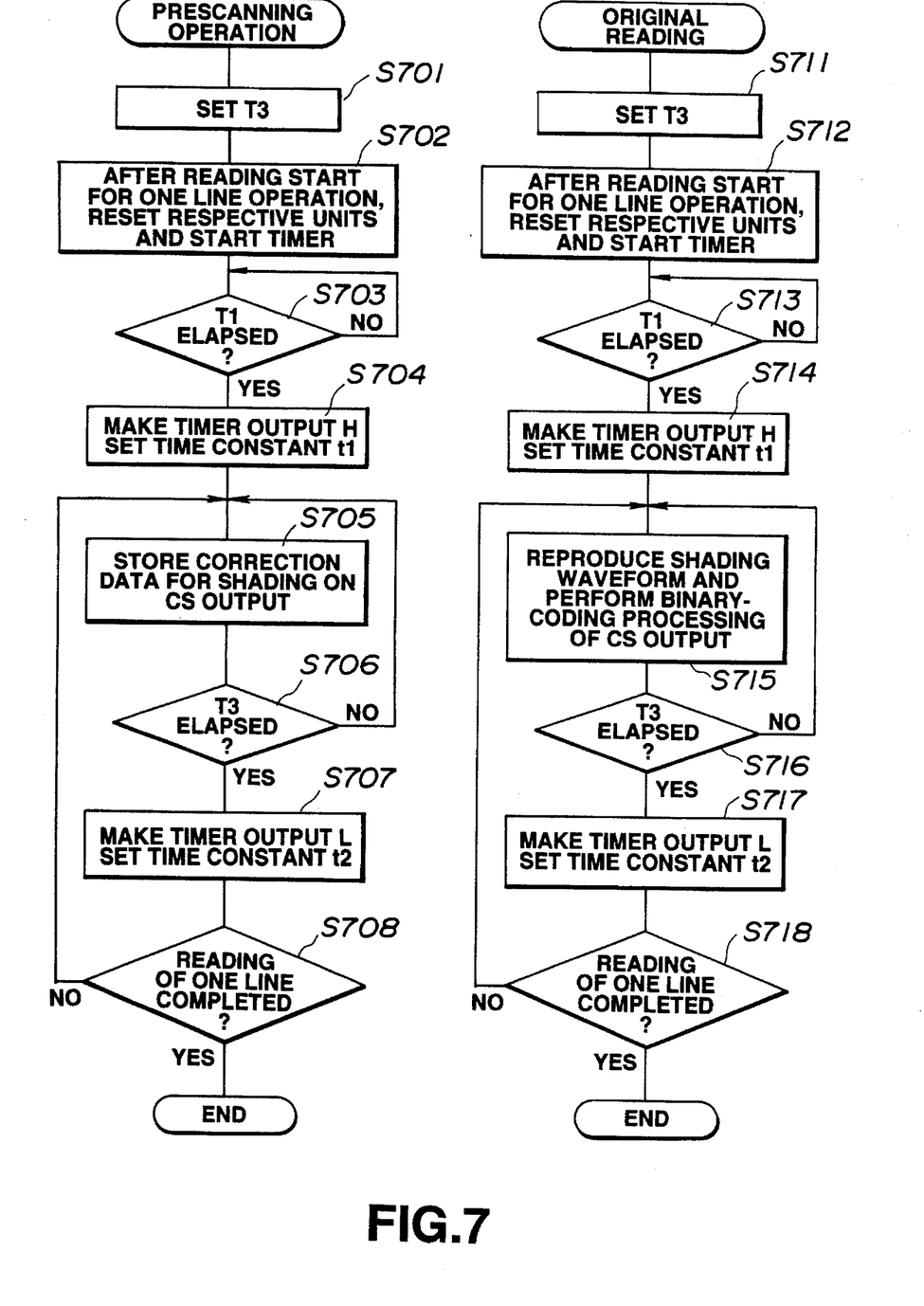
FIG. 7 is a flowchart of the operation of the second embodiment.

In FIG. 6, a reading start signal for one line and a reading clock signal are the same as those in the first embodiment shown in FIG. 3, and a description thereof will be omitted.

A timer output signal shown in FIG. 6 is the output of the timer unit 100 shown in FIG. 1, and is represented by reference numeral 126 in FIG. 5. After measuring a time T1 until the start of the output of the CS 200 shown in FIG. 1 after a reading start for one line operation, an arbitrarily set time T3 is measured. Between the time T3 and the time T1, the timer output signal 126 shown in FIG. 5 is made 1 (high).

A prescanning operation will now be considered. After setting the timer value T3 (step S701), the timer unit 100 is started when a reading start signal for one line has been input (step S702). Until the lapse of the time T1 before reading white background to be read (step S703), the timer output shown in FIG. 5 is made 0 (low). After the lapse of the time T1, the timer output is made 1 (high) until the time T3 (step S704). Accordingly, the analog switch 124 is set to the side of the resistor 120 (the short time constant is t1), and the peak value of the reference white background to be read is charged in the shading capacitor 52 via the buffer amplifier 44 and the charging resistor 120 (step S705).

As a result, electric charges in the shading capacitor 52 are rapidly charged in,the vicinity of the first bit of the sensor output, so that the reference signal (shading waveform) can promptly rise as shown in FIG. 6. Thereafter, the reference signal 60 is compared with the video signal 24 by the comparator 56, and the result of the comparison is stored in the shading-data memory 58 as shading correction data. At the same time, the data is output as the memory output 59, and the reference signal (shading waveform) is provided by charging/discharging the shading capacitor 52 by closing/opening the analog switches 46 and 48.

After measuring the time T3 the timer output signal 126 is made 0 (low) and the analog switch 124 is set to the side of the resistor 122 (the long time constant is t2) which is suitable for storing/reproducing the shading waveforms, and the above-described processing is performed.

Similarly, in a subsequent original-reading operations after the lapse of the time T1 after a reading start for one line operation (step S713), the shading capacitor 52 is charged with the short time constant t1 until the time T3 (steps S714 and S715). After the lapse of the time T3 (step S716), the long time constant t2 is set. The analog switches 46 and 48 are opened/closed in accordance with the reading output 59 from the shading-data memory 58, and the shading waveform (reference signal) is reproduced (step S717).

As a result, as shown in FIG. 6 the reference signal follows the original-reading video signal substantially immediately after the sensor output, so that the number of error portions, such as portion f, is considerably reduced.

In the above-described second embodiment, there is provided the timer unit 100, which measures the time T1 until the CS 200 starts a reading operation after a reading start signal for one line has been output, and the arbitrarily set time T3 after starting a reading operation of the sensor, outputs 1 (high) between the time T3 and the time T1, and outputs 0 (low) for other time periods. The analog switch 124 for selectively setting the short time constant t1 and the long time constant t2 for charging the shading capacitor 52 in accordance with the timer output signal is also provided, so that the shading capacitor 52 is charged with the short time constant t1 until the time T3 after starting the reading operation of the sensor. It is thereby possible to improve the leading edge of the reference signal (shading waveform) in the vicinity of the first bit of the output of the CS sensor, and to substantially prevent missing information caused by disturbance or a white portion in the image in the vicinity of the leading edge.

The individual components shown in outline or designated by blocks in the drawings are all well known in the image processing apparatus arts and their specific construction and operation are not critical to the operation or the best mode for carrying out the invention.

While the present invention has been described with respect to what is presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image processing apparatus comprising:

reading means for photoelectrically reading an image;

forming means for forming a reference signal which follows an output signal from said reading means;

detecting means for detecting whether a level of the output signal from said reading means is greater or smaller than a level of the reference signal;

capacitance means for performing a charging operation or a discharging operation in accordance with a result output from said detecting means; and switching means for switching a time constant of a circuit for charging said capacitance means, during a predetermined time period after the start of the output of the output signal from said reading means.

2. An image processing apparatus according to claim 1, wherein said capacitance means comprises a capacitor.

3. An image processing apparatus according to claim 1, further comprising storage means for storing a result of the detection of said detecting means.

4. An image processing apparatus according to claim 1, further comprising setting means for setting a threshold in accordance with a charging voltage of said capacitance means, and for performing binary-coding processing of the output of said reading means in accordance with the threshold.

5. An image processing apparatus according to claim 1, wherein said forming means changes a level of the reference signal in accordance with a result obtained from said detecting means.

\* \* \* \* \*

UNITED STATES PATENT AND TRADEMARK OFFICE
CERTIFICATE OF CORRECTION

PATENT NO. : 5,559,610

DATED : September 24, 1996

INVENTOR : KOZO TODA

It is certified that error appears in the above-identified patent and that said Letters Patent is hereby corrected as shown below:

COLUMN 3

Line 28, "sensor 20;" should read --sensor 2;--.

COLUMN 7

Line 33, "signal 06" should read --signal 106--.

COLUMN 8

Line 23, "capacitor" should read --capacitor 52.--.

Signed and Sealed this

Fourth Day of March, 1997

Attest:

BRUCE LEHMAN

Attesting Officer

Commissioner of Patents and Trademarks